Jan. 5, 1937.   W. D. APPEL ET AL   2,066,311
MACHINE FOR TESTING FABRICS
Filed June 5, 1934    4 Sheets-Sheet 3

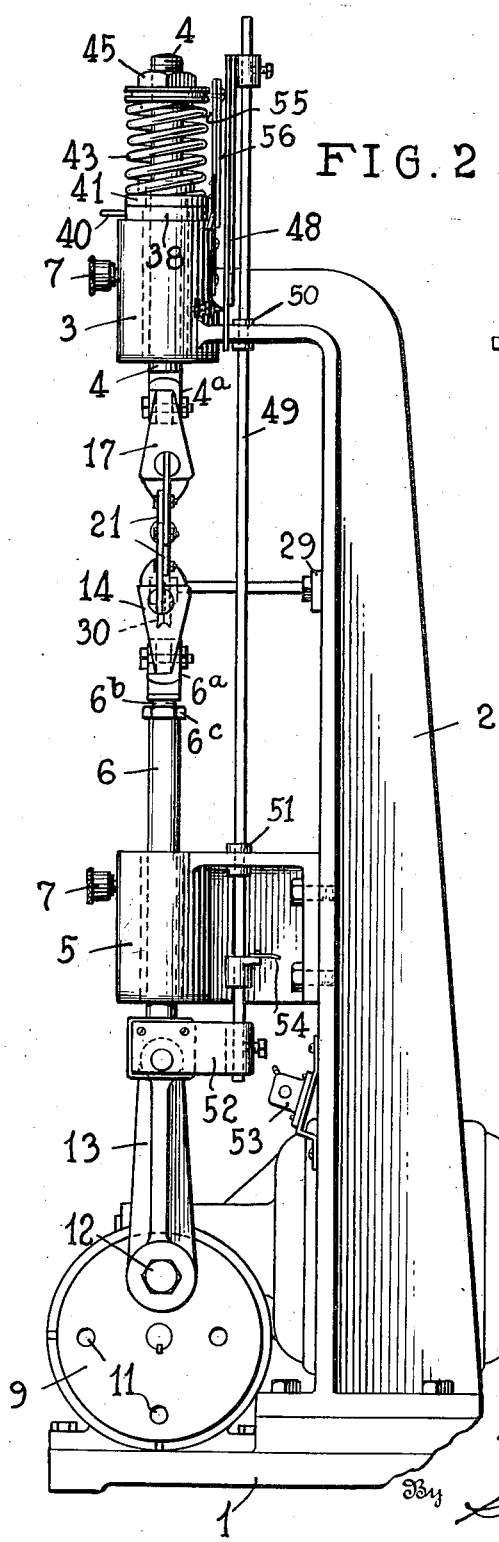
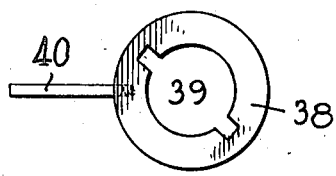
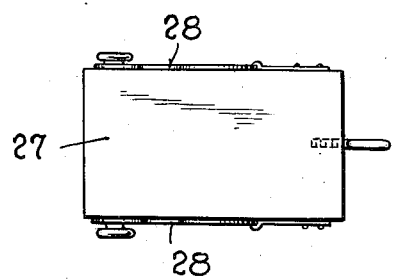
FIG. 2.
FIG. 3.
FIG. 4.

Inventors
William D. Appel.
Herbert F. Schiefer.
By Stone, Boyden & Mack
Attorneys Jan. 5, 1937.  W. D. APPEL ET AL  2,066,311
MACHINE FOR TESTING FABRICS
Filed June 5, 1934  4 Sheets-Sheet 4

Inventors
William D. Appel.
Herbert F. Schiefer.
By Stone, Boyden & Mack
Attorneys Patented Jan. 5, 1937

2,066,311

UNITED STATES PATENT OFFICE 2,066,311

MACHINE FOR TESTING FABRICS

William D. Appel and Herbert F. Schiefer, Washington, D. C., assignors to the Government of the United States, represented by the Secretary of Commerce Application June 5, 1934, Serial No. 729,159

11 Claims. (Cl. 265—2)

(Granted under the act of March 3, 1883, as amended April 30, 1928; 370 O. G. 757)

The invention described herein, if patented, may be manufactured by or for the Government for governmental purposes without the payment to us of any royalty thereon.

This invention relates generally to testing machines. More particularly, it relates to apparatus for testing tubular woven or knitted fabrics to determine their serviceability.

In the specific embodiment illustrated and described herein is shown a device adapted for testing the resistance of hosiery to wear and which is designed to impose upon the article being tested stresses and strains substantially similar to those encountered in ordinary use. This machine is particularly directed toward a simulation of the stretching at the knee portion and upper end of stockings.

It is a general object of this invention to provide a testing machine of this type which will be suitable for giving accurate reliable results suitable for making comparative tests of hosiery or similar woven or knitted tubular articles.

Articles of the type which the machine herein disclosed is designed to test are more or less elastic and during wear and use are subjected to forces which stretch them materially.

It is an object of this invention to provide a machine which will reproduce substantially this same stretching action and which at the same time will accurately record the magnitude of the deformation of the article being tested, as well as the comparative force required to produce such deformation at different stages during a test.

A further object of the invention is to provide recording means whereby both of these records may be accurately recorded on the same chart.

Another object of the invention consists in means for mounting the article to be tested upon the machine in a manner so that the elements holding the article exert thereon substantially the same forces as are imposed upon the article during wear and use.

The above and other and further features of the invention are described and claimed in the following specification and claims and illustrated in the accompanying drawings, in which:

Fig. 2 is a side elevation of the machine, no stocking being illustrated;

Fig. 3 is a plan view of the ring used to control the operation of the force registering mechanism;

Fig. 4 is a plan view of the block used for securing the article to be tested on the machine;

Figure 1:
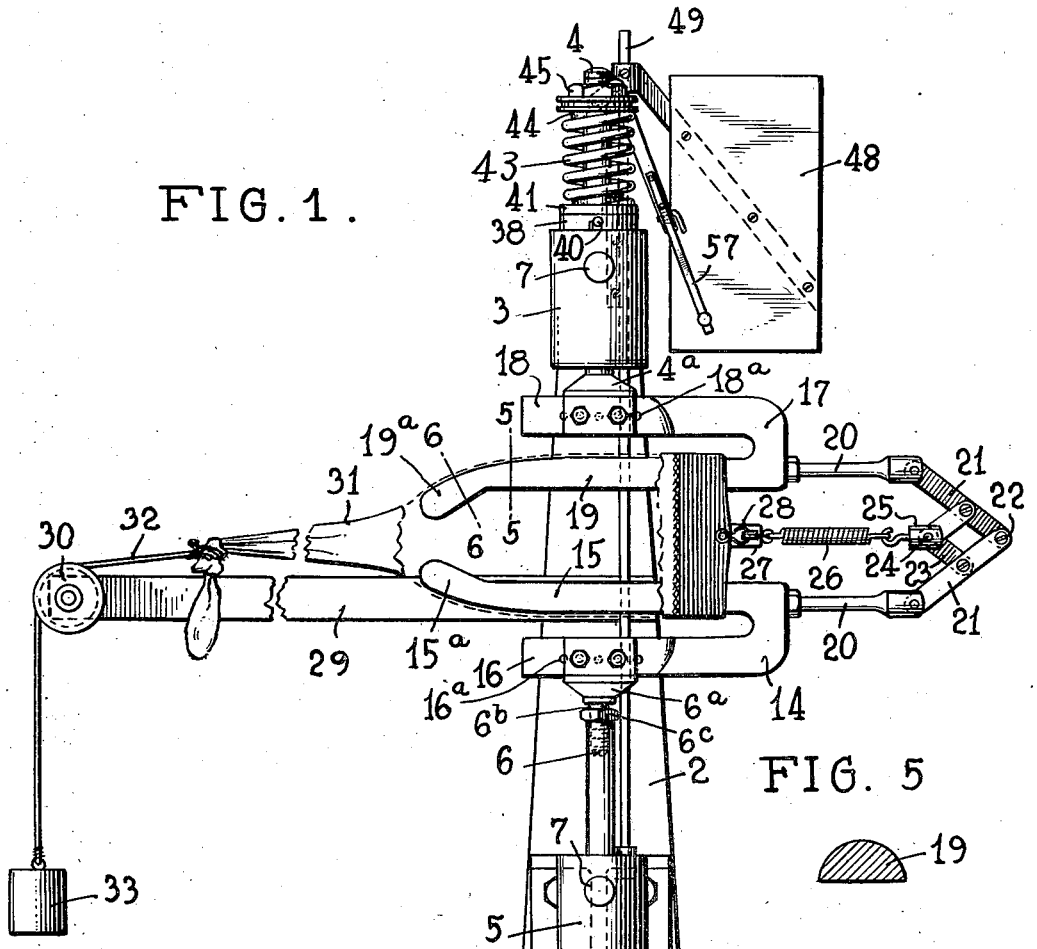
Fig. 1 is a front elevation of the complete machine showing a stocking mounted thereon.
Figure 7:
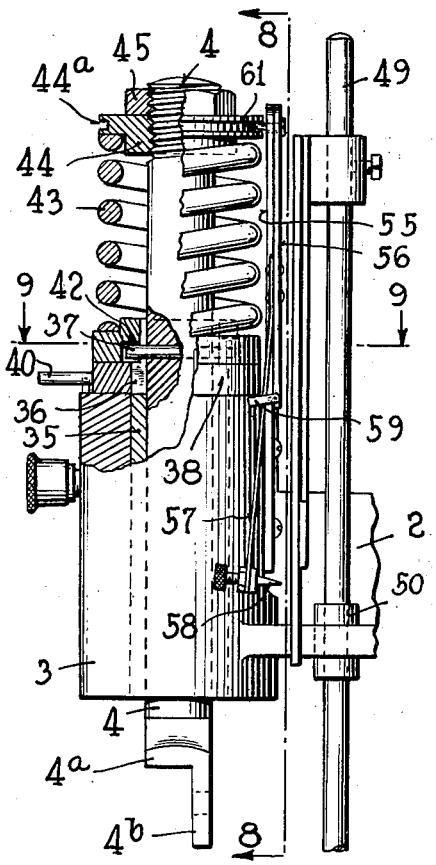
Figure 8:
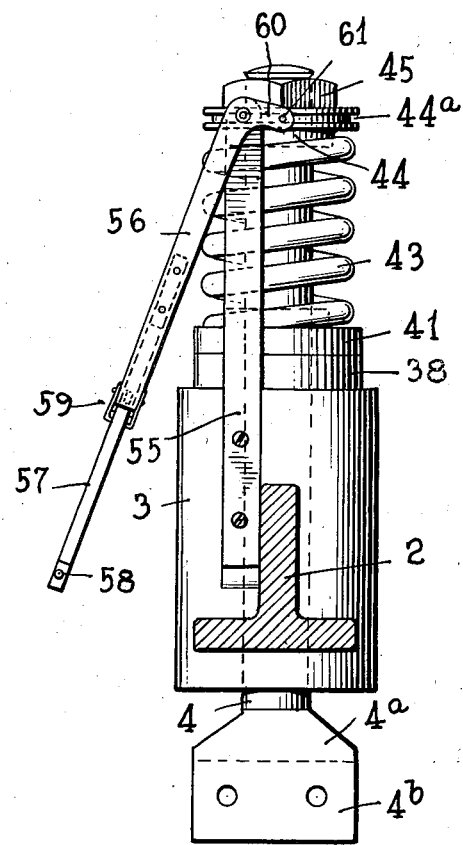
Figure 9:
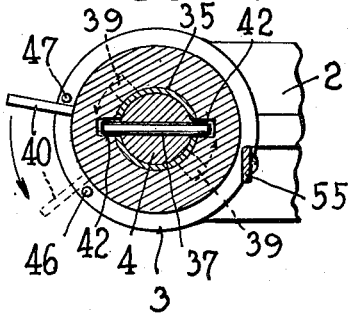
Figure 10:
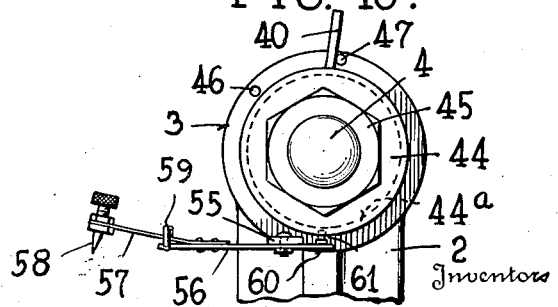
Figure 11:
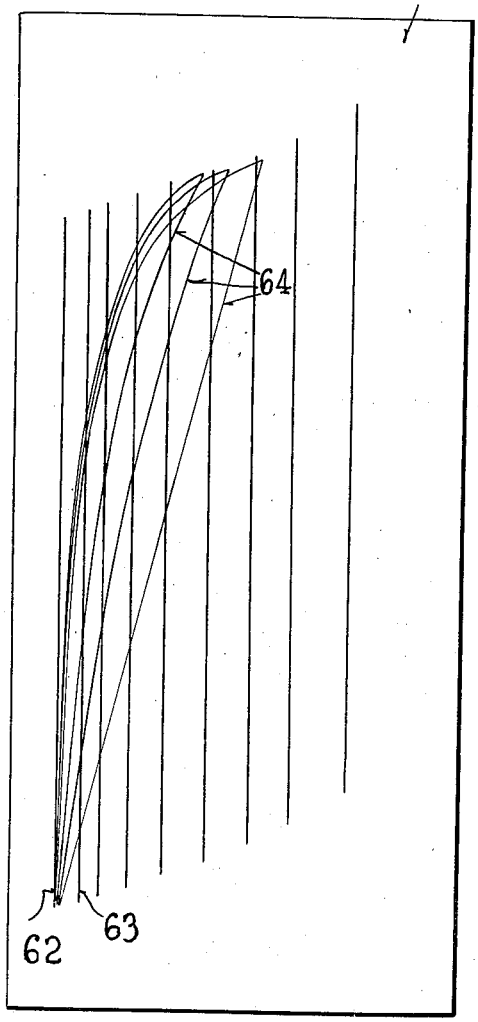
Figure 12:
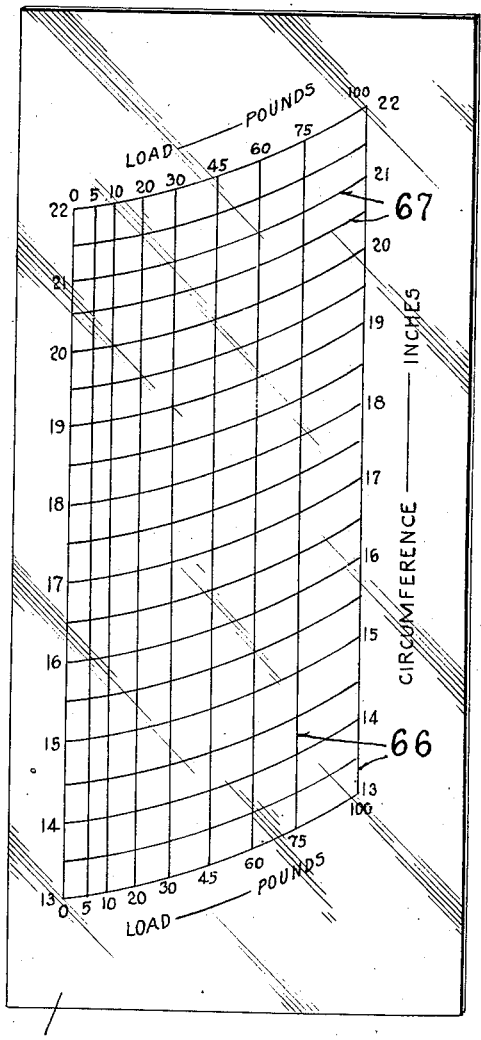

Figs. 5 and 6 are cross sectional views of a work supporting arm on the lines 5—5 and 6—6 respectively of Fig. 1;

Fig. 7 is an enlarged view of a side elevation of the upper bushing and rod, partly broken away;

Fig. 8 is a sectional view taken on the line 8—8 of Fig. 7, looking in the direction of the arrows;

Fig. 9 is a section taken on the line 9—9 of Fig. 7;

Fig. 10 is a top plan view of the upper head and bushing;

Fig. 11 is a plan view of a record sheet on which a number of readings have been taken; and Fig. 12 is a plan view of a transparent scale used for reading the record charts.

With more particular reference to the drawings, the embodiment of the apparatus herein illustrated comprises a base 1, having mounted thereon a main support 2, which members, together form the means for supporting the various parts of the machine.

At the upper end of the main support 2 is an upper bearing support 3, serving as a bearing and guide for vertically extending rod 4. Between the upper bearing support 3 and the base plate 1 is a lower bearing support 5, adapted to support a reciprocatory rod 6. Each of these bearing supports is provided with suitable grease cups 7 adapted to lubricate the internal surface thereof in order to facilitate reciprocating movement of the rods 4 and 6.

A suitable electric motor 8 is mounted upon the base plate 1 and serves to drive a rotatable plate 9 through a worm reduction gear 10. The plate 9 is provided with a plurality of holes 11 therein of varying radial distance from the axis thereof, and in one of which holes a stud 12 is secured. On it is pivotally mounted a connecting rod 13, the upper end of which is pivotally secured to the lower end of the reciprocating rod 6. The operation of the electric motor 8 serves to cause a reciprocation of the rod 6 up and down, the length of such reciprocation depending on which of the holes 11 in the eccentric plate is used for mounting stud 12 and the connecting rod 13.

The upper end of the vertically reciprocatory rod 6 is connected to a U-shaped member 14, the parallel elements of which comprise a laterally extending arm 15 adapted to be inserted within the tubular fabric member to support the same while being tested and a second laterally extending member 16 adapted to be secured to the upper end of the reciprocatory rod 6. These two members together form a substantially U-shaped integral member adapted to support one side of the material being tested. The outer surface of the member 15 which serves to engage the material being tested is, as is shown in the sectional views in Figs. 5 and 6, smoothly rounded to provide a relatively large smooth surface upon which the fabric may be seated.

The lower end of the upper rod 4 is provided with an identical or complementary U-shaped member 17, having a laterally extending member 18 adapted to be secured to the lower end of the rod 4 and a second laterally extending member 19 similar to the member 15 adapted to extend within the material being tested to support the same. The lower end of the rod 4 is broadened out and provided with a terminal portion 4ª having substantially the cross sectional shape of an inverted L, the depending part 4ᵇ constituting a flange and being offset with respect to the axial center of the rod 4. In this way, the member 18 is centered with respect to the rod 4 when 18 is bolted to the face of the flange 4ᵇ.

The upper end of the rod 6 is provided with a terminal portion 6ª similar to that at 4ª and complementary in that the flange of the L-shaped portion extends upwardly for the reception of the member 16. Means for adjusting relatively finely the height of the arm 15, or in other words the length of the rod 6, is provided by the construction in which the rod 6 is threaded internally at its upper end for the reception of an exteriorly threaded smaller rod 6ᵇ which carries a lock nut 6ᶜ to engage the upper end of the rod 6.

The members 16 and 18 are provided with a plurality of spaced holes 16ª and 18ª, respectively, these holes serving to provide means for attaching the members to their respective reciprocating rods. It is apparent that these holes serve to permit lateral adjustment of the members 14 and 17 with respect to the rods on which they are mounted, in order that the rods and bearings in which they slide may be relieved of unnecessary lateral stresses and in order that the members 14 and 17 may be properly centered with respect to each other and with respect to their operating rods.

Although the shape and form of the laterally extending portions of these arms 15 and 19 may be materially modified, depending upon the nature, size and shape of the particular material being tested, as shown, they are constructed for testing women's hosiery. They are especially shaped to receive the upper end and knee portion of long hosiery for stretching tests. The respective end portions 15ª and 19ª of the arms are inclined somewhat toward each other, thus giving a curved contour to each arm 15 and 19. Movement of the arms apart provides a stretching test simulating that caused by bending the knee and otherwise occasioned by stretching the top when a stocking is drawn on or removed.

The connections between the arms 15 and 19 and the work supporting means will now be described. A pair of studs 20 are mounted in the end portion of each of the arm members and have a pair of links 21 each pivoted at one end to the outer ends of the studs 20 and at the other ends pivoted together at 22. Each of these links 21 has pivoted thereto intermediate its ends a link 23. These links 23 are pivoted together at 24 and secured pivotally to a block 25 which serves to provide means for mounting one end of a spring 26. The other end of the spring 26 is hooked to or otherwise secured to a spacing block 27 constructed of wood or any other suitable material shown in plan in Fig. 4 and having mounted on each side thereof a garter clasp 28. The thickness of the block 27 is substantially the same as the width of the arms 15 and 19 so that the garter clasp will lie adjacent the end of the tubular fabric material embracing the arms. These garter clasps or other suitable retaining elements serve to provide means for holding the stocking or other material to be tested in a given position on the arms 15 and 19, as shown in Fig. 1.

It will be seen that as these arms 15 and 19 are moved relative to each other, the action of the toggle links 21 and 23 will serve to merely hold the stocking or may exert a slight lateral pull upon the material being tested, depending on the length of the links 23 and the points along the links 21 at which links 23 are connected. It will also be seen that the toggle links 21 and 23 always maintain the blocks 25 and 27 at a position equidistant between the arms 19 and 15.

A laterally extending arm 29 is secured to the standard 2 and extends in a direction parallel to the arms outwardly away from the machine a substantial distance, and is provided at its outer end with an idler pulley 30.

It will now therefore be seen that a stocking 31 may have its upper end slid over the arm members 19 and 15 and have the welt edge thereof secured to the garter clasps 28. A cord 32 is attached to the opposite end portion of the stocking and extends over the idler pulley 30 to a weight 33, which serves to maintain a suitable tension upon the stocking during the testing operation. It will now be seen, that if the member 17 is held substantially stationary and the electric motor 8 is started in operation, this will cause a reciprocation of the rod 6 and its member 14 throughout a definite predetermined distance. The reciprocation of this latter member will serve to repeatedly stretch the upper portion of the stocking 31 and subject it to substantially the same stresses and strains as it is subjected to when it is worn by a person walking or bending the knee.

It will further be seen that the stocking thus mounted will have present the same stresses applied by the garter clasps 28 as are encountered during ordinary wear.

The means for mounting the upper member 17 and its vertical rod 4 are shown in detail in Figs. 7, 8, 9, and 10. The details of this mounting have a particular significance in connection with means for recording the tests as will be explained. The bushing 3 is provided internally thereof with a bearing sleeve 35, which closely surrounds and guides the vertical reciprocating rod 4.

This bearing sleeve extends a substantial distance above the upper surface of the bushing 3 and in this upwardly extending portion is provided with a pair of diametrically opposed axial slots 36. These slots serve to receive and guide a transverse pin 37 which extends through the rod 4. Inasmuch as the pin 37 is longer than the outside diameter of the sleeve 36, each end thereof will protrude from the slots 36 and abut against the upper end of the bushing 3, thus limiting downward movement of the pin 37 and consequently the rod 4.

Riding on the upper end of the bushing 3 is a ring 38. This ring surrounds the sleeve 35 and also contains a pair of diametrically opposed slots 39 therein and is provided with a handle 40 secured in its outer periphery and extending like a rod radially outward to provide means for rotating the ring. This ring 38 is shown in plan view in Fig. 3.

Resting upon the upper surface of the ring 38 and also fitting closely around the sleeve 35 is a washer 41 having a pair of diametrically opposed notches 42 of a size sufficient to house the ends of the pin 37.

The upper surface of this washer 41 serves to seat a compression spring 43, which is coiled around the rod 4 and is confined at its upper end by means of a washer 44 surrounding the stud 4 and held in place by a suitable nut 45, threaded on the upper end of the rod 4.

A pair of studs 46, 47 are mounted vertically on the upper end of the bushing 3 and serve to limit the rotary movement of the ring 38. As is seen in Fig. 9, when the operating handle 40 is in the position as shown, against the stud 47, the slots in the ring will not register with the slots in the sleeve 35 or with the pin 37. Consequently, movement of the rod 4 is limited in downward direction by the upper surface of the ring 38. Now, it may be seen that due to the fact that the notches 42 are of just sufficient size to house the pin 37, vertical movement of the rod is virtually prohibited. However, when the ring 38 is rotated so that the operating handle 40 lies against the stud 46, the slots 39 in the ring and the slots 36 in the bushing 35 are brought into registry and the pin 37 is permitted to reciprocate through the axial length of the ring 38. However, at all times downward movement of the rod 4 is resisted by the coil spring 43. Inasmuch as the rod 4 serves to support the member 17, it will be seen that when the ring 38 is rotated so that the slots therein register with the slots 36 in the bushing 35, a limited resiliently resisted reciprocating movement of the rod 4 and member 17 is permitted.

Due to the force exerted by the coil spring 43, it will be seen that the movement of this rod 4 and member 17 is directly proportional to the amount of force exerted on the member 17 in a downward direction.

In order to record the length of the relative movement of the members 14 and 17, a chart 48 is provided suitably mounted upon a vertically slidable rod 49 extending through bushings 50 and 51 in the support 2 and the bearing support 5. The lower end of the rod 49 is connected by a bracket 52 to the lower end of the reciprocating rod 6. It will therefore be seen that as the rod 6 is reciprocated up and down by means of the electric motor, the rod 49 carrying the chart will be similarly moved exactly the same distance.

A mechanical counter or odometer 53 is mounted upon the vertical support 2 in such a position that the actuating crank thereof lies in the path of a suitable trip mechanism 54 secured to the vertical chart support rod 49. This arrangement serves to actuate the odometer once for every revolution of the cam plate 9 and consequently the odometer will indicate each reciprocation of the rod 6.

The means for recording tests will now be described. On the rear side of the bearing support 3 is mounted a fixed vertical support 55, which has its upper end lying adjacent the outer periphery of the washer 44. Pivoted adjacent the upper end of the support 55 is a pen arm 56 having secured thereto by means of a suitable spring member 57 a pen or stylus 58, adapted to bear against the surface of the chart 48. As is conventional in structures of this kind, a cam 59 is provided between the pen arm 56 and the spring 57 in order to raise the pen 58 from the surface of the chart 48.

The pen arm 56 is in the nature of a bell crank, and is pivoted at its vertex to the support 55 and has its short arm 60 extending laterally therefrom in a position substantially tangential to the outer periphery of the washer 44. The washer 44 in its outer periphery is provided with an annular groove 44ᵃ adapted to receive a pin 61 carried by the arm 60 of the bell crank pen arm. It will be seen that due to the substantial difference in lengths of the two arms of the bell crank, that vertical movement of the rod 4 through the washer 44 will be considerably magnified and transmitted to the pen or stylus 58. Therefore, slight vertical movement of the rod 4 will cause the stylus 58 to move in an arc laterally across the chart 48.

As was noted above, the movement of the member with its arm 19 and the rod 4 on which it is mounted is resisted by the compression spring 43, and is of a relatively limited nature. Due to the resistance of the spring 43, the magnitude of this movement is directly proportional to the downward force exerted upon the arm 19, and consequently, due to the manner in which the stylus 58 is connected to the upper end of the rod 4, this downward movement of the rod 4 will serve to indicate upon the chart 48 the magnitude of the downward force exerted on the arm 19. It may therefore be seen that the chart may be calibrated horizontally in pounds of force exerted on the arm 19.

Due to the mounting of the chart on the reciprocating rod 49, it will be seen that the chart will move vertically up and down in exact accordance with the movement of the lower arm 15, and consequently the vertical calibration of the chart will indicate the length of the stroke of the lower arm 15. Also, it may be calibrated to indicate the variation in circumference of the tubular fabric material mounted upon the jaws.

The ring 38, it will be seen, may be rotated by the handle 40 and prevent reciprocation of the rod 4. This ring permits the downward force to be transferred from the spring 43 to the upper surface of the ring 38, thus rendering the recording device inoperative at will, and it will be seen that this change may easily be made by rotation of the ring 38 without interrupting the operation of the machine. Likewise, the cam 59 serves to raise the stylus 58 from the surface of the chart except at those times when it is desired to record the length of stroke of the machine and/or the force exerted upon the fabric.

In making a test of a stocking, the upper portion of the stocking 31 is slid onto the arms 19 and 15, and opposite points of the welt thereof are secured to the garter clasps 28 on either side of the block 27. The position shown in Fig. 1 is such as to provide a fairly snug fit on the arms, that is a moderate tension. The cord 32 is secured to the opposite end of the stocking and passed over the idler pulley 30 to the weight 33, to insure a constant and uniform lengthwise tension on the stocking during the test.

Now, suppose the ring 38 is moved to a position so that the slots 39 therein register with the slots 36 in the sleeve 35 and the cam 59 is adjusted so that the stylus 58 rests upon the surface of the chart 48. The electric motor is then started and the ensuing reciprocation of the rod 6 will cause a relative reciprocation of the arms 19 and 15 with respect to each other. The length of this reciprocation is duly recorded by the movement of the chart 48 with respect to the stylus 58, and serves to indicate the circumferential length to which the stocking is stretched. Each time the stocking is stretched by a downward movement of the reciprocating rod 6, the odometer 53 is actuated to record one cycle of operation. Each time, likewise, the lower arm 15 moves downward to stretch the stocking, a definite downward force is exerted on the upper arm 19 due to the resistance to the stretching operation offered by the stocking. This downward force is transmitted by means of the rod 4 to the spring 43, and as has been described above, the downward movement of the rod 4 is directly proportional to the force exerted.

Due to the bell crank mounting of the pin arm 56 and its cooperation with the rod 4, it will be seen that the magnitude of this downwardly exerted force will be translated into an arcuate movement of the stylus laterally across the chart directly proportional to the magnitude of this force. Consequently, upon the chart simultaneously are recorded the circumferential length of the stocking being tested and the resisting force offered by the stocking at every moment during the test.

While the electric motor continues to run, the recording apparatus may be at any time rendered inoperative by rotation of the ring 38 and turning the cam 59 to raise the stylus 58 from the chart.

In ordinary operation of the machine, after a number of preliminary readings have been obtained, the machine is permitted to run a predetermined number of cycles and a second set of readings may be taken without interrupting the operation of the machine. This procedure is continued until a rupture or defect in the stocking being tested occurs. Inasmuch as the stresses and strains imposed upon the stocking by the reciprocation of the two arms 19 and 15 are substantially the same as those encountered during actual wear and use, the readings obtained and the number of cycles required to produce a rupture in the fabric give an excellent index of the wearing qualities of the stocking.

The recording chart and guide scale shown in Figs. 11 and 12, is particularly adaptable to this type of apparatus and the manner in which it is used in connection therewith is substantially as follows.

The chart 48, shown in Fig. 11, is a plain piece of white paper, in case a pen is used as the recording instrument, or a piece of waxed or carbon tissue in the event that a stylus such as 58 is used. Prior to the time the stocking is placed upon the machine to test, the plate 9 is rotated to bring the lower arm 15 up to the peak of its reciprocatory movement.

The cam 59 is then adjusted to permit the pen or stylus to come into contact with the surface of the chart 48. It will then rest in the lower lefthand corner of the chart. The plate 9 then is rotated through one complete revolution and the stylus will trace a vertical line 62 on the chart 48 of exactly the length of the stroke of the lower member. The ring 38 is then rotated so that the slots 39 therein register with the slots 36 in the bushing 35, and a dead weight of predetermined value is placed upon the upper end of the rod 4. This weight will compress the spring, consequently moving the stylus slightly to the right. With this known force exerted upon the rod 4, the plate 9 is again rotated through a complete revolution, and a second vertical line 63 is traced on the chart. The spring 43 may, in this manner, be calibrated for any desired weight.

After the chart has been calibrated, a stocking is placed upon the machine and subjected to the test as described above. From time to time, as has been explained, readings may be taken by rotating the ring 38 to permit registry on the chart of the force exerted on the arm 19. These various readings are indicated by the curves 64.

After the conclusion of the test, in order to aid in reading the chart, the scale 65 shown in Fig. 12 may be used. This scale is preferably made of celluloid or glass so that it will be transparent, and has vertical lines 66 on it corresponding to the proper calibration of the particular spring being used. These lines on the scale 65 serve to check the calibration of the spring made on the chart 48. The transverse arcuate lines 67 serve as a gauge to indicate the length of stroke of the machine, and have been spaced in accordance with the movement of the lower arm 15 and corrected for the movement of the upper arm 19 due to compression of the spring. Consequently, vertical readings on the scale 65 will indicate the net relative displacement of the arms 15 and 19 with respect to each other. The scale 65 being transparent may be superimposed on a chart 48, and readings from the curves 64 may be taken directly from the scale.

Although the embodiment of the invention illustrated herein has features and elements which render it particularly adaptable to testing hosiery, it will be clearly apparent that the form of the invention herein shown is merely illustrative of one of many embodiments of the inventive concept taught. It will be further apparent that many and various modifications of the apparatus may be devised for testing various types, shapes and forms of material without departing from the generic spirit of the invention, as defined in the following claims.

The hereinbefore mentioned development of ruptures or defects in the stocking or other material being tested may be defined as failure, which term is sometimes used to designate the breakdown of material being tested, and as the point at which tests may be considered as concluded.

We claim:

1. A machine for testing articles in tubular form, comprising two independently movable supporting elements formed to receive in tubular form and support the article to be stretched, means for moving one of said elements repeatedly for a predetermined distance to stretch the article circumferentially, and means for placing a stress on the article in the direction of its length, and alternately increasing and diminishing the same during a stretching operation.

2. A machine for testing articles made in tubular form comprising a pair of relatively movable members insertable in the article in such form for supporting the article, means for positively actuating one member, and yielding means for controlling the movements of the other member for the purpose set forth, and means for alternately stretching the article to a substantially predetermined degree and in lengthwise direction under a substantially predetermined tension.

3. A machine for testing articles made in tubular form, comprising means normally maintaining the article under tension in the direction of its length, and means for stretching said article repeatedly to a predetermined degree circumferentially.

4. In a machine for testing articles in tubular form, in combination, means for supporting the article in such form, means for repeatedly stretching the article circumferentially and means formed to place a stress on the article in the direction of its length simultaneously with the circumferential stress.

5. In a machine for testing fabrics, in combination, a pair of relatively movable supporting members, means for reciprocating one of said members relative to the other to repeatedly stretch the article circumferentially, and means for tensioning the article lengthwise alternately with the circumferential stretch comprising toggle links pivotally connected to the respective movable member and to each other, a fastening device to which the article is removably attached, and a spring interposed between the fastening device and the toggle links.

6. In a testing machine of the character described, in combination, a pair of movable arms arranged to support the article to be tested, means for moving one of said arms positively and repeatedly, a spring-resisted reciprocable rod supporting the other arm, a pin carried by the rod, a rotatable ring surrounding the rod and having a recess therein adjacent the rod, the rotation of the ring serving to bring the pin into registry with the recess to permit movement of the rod, or out of registry to lock the rod against movement.

7. A machine for testing articles in tubular form comprising means for repeatedly stretching the article circumferentially to a substantially predetermined degree, and means for simultaneously stretching the article in lengthwise direction under substantially predetermined tension.

8. A machine for testing articles in tubular form comprising two relatively movable members formed to receive and support the tubular article, one of said members being positively moved and the other member being relatively moved yieldingly in the same direction by the stress of the article stretched, to circumferentially stretch said article, and means associated with said members for repeatedly stretching the article lengthwise simultaneously with the circumferential stretch.

9. In a machine for testing stockings and like articles, two opposed arms adapted to support the article for a substantial part of its length, means for yieldingly supporting one of said arms, the other being reciprocable, means for repeatedly and positively reciprocating said other arm relative to the yieldingly supported arm, record-receiving means connected with the means for reciprocating said other arm and moved by said reciprocable arm, a stylus-carrying arm pivotally mounted on a fixed part of the machine and controlled by the movement of the yieldingly supported arm and cooperating with the record-receiving means to simultaneously record the magnitude of the stretch and the force required therefor.

10. A machine for testing stockings and like articles, comprising two opposed arms shaped to enter and support the article, yielding means for supporting one of said arms, the other arm being reciprocable, means for reciprocating the reciprocable arm repeatedly and positively with relation to the other arm, a chart connected with the arm-reciprocating means and moved thereby and in unison therewith, a stylus arm pivoted intermediate its length to a fixed part of the machine and contacting at one end with said yielding means, whereby the stylus will record on the chart the force applied to the article and the extent of the stretching thereof.

11. A machine for testing articles in tubular form such as stockings and the like, comprising two independently movable arms shaped to enter and support the article for a substantial part of its length, means for reciprocating one of said arms to repeatedly and continuously stretch the article circumferentially, yielding means supporting the other arm, means for simultaneously recording the magnitude of the stretch and the force required for each successive stretch including a continuously reciprocating chart connected with and actuated by the reciprocated arm and moving therewith, a stylus arm pivoted intermediate its length to a fixed part of the machine and contacting at one end the said other arm whereby the stylus will record on said chart the force applied to the article and the extent of the stretching thereof.

WILLIAM D. APPEL.
HERBERT F. SCHIEFER.